(12) United States Patent
Skriba et al.

(10) Patent No.: US 10,597,992 B2
(45) Date of Patent: Mar. 24, 2020

(54) CLAY INHIBITORS FOR DRILLING, FRACTURING, AND OTHER PROCEDURES

(71) Applicant: Ingevity South Carolina, LLC, North Charleston, SC (US)

(72) Inventors: Michael J. Skriba, Charleston, SC (US); Reinaldo C. Navarrete, Houston, TX (US); Joseph A. Monahan, Mount Pleasant, SC (US); Raymond H. Pieternella, Houston, TX (US)

(73) Assignee: INGEVITY SOUTH CAROLINA, LLC, North Charleston, SC (US)

( * ) Notice: Subject to any disclaimer, the term of this patent is extended or adjusted under 35 U.S.C. 154(b) by 1132 days.

(21) Appl. No.: 14/891,061

(22) PCT Filed: Apr. 23, 2014

(86) PCT No.: PCT/US2014/035074
§ 371 (c)(1),
(2) Date: Nov. 13, 2015

(87) PCT Pub. No.: WO2014/186098
PCT Pub. Date: Nov. 20, 2014

(65) Prior Publication Data
US 2016/0102539 A1    Apr. 14, 2016

Related U.S. Application Data

(60) Provisional application No. 61/823,289, filed on May 14, 2013.

(51) Int. Cl.
*C09K 8/34* (2006.01)
*E21B 43/26* (2006.01)
(Continued)

(52) U.S. Cl.
CPC .............. *E21B 43/26* (2013.01); *C09K 8/035* (2013.01); *C09K 8/34* (2013.01); *C09K 8/62* (2013.01);
(Continued)

(58) Field of Classification Search
CPC .............. C09K 8/34; C09K 8/62; E21B 43/26
(Continued)

(56) References Cited

U.S. PATENT DOCUMENTS

| | | | |
|---|---|---|---|
| 2,873,251 A | 2/1959 | Jones, Jr. | |
| 4,597,878 A * | 7/1986 | House | C08G 69/34 507/107 |

(Continued)

OTHER PUBLICATIONS

International Preliminary Report on Patentability, for PCT/US2014/035074, dated Nov. 17, 2015.
(Continued)

*Primary Examiner* — William D Hutton, Jr.
*Assistant Examiner* — Ashish K Varma
(74) *Attorney, Agent, or Firm* — Bryan D. Zerhusen, Esq.; Nicholas R. Herrel, Esq.; Cantor Colburn LLP (57) ABSTRACT

A distillation residuum bottoms composition and other alternative amine compositions are used as clay inhibitors in water-based drilling fluids and in hydraulic fracturing fluids for drilling wells and for fracturing subterranean formations, and are also used as clay inhibitors in other treatment fluids for treating wells or subterranean formations.

39 Claims, 3 Drawing Sheets

(51) Int. Cl.
*C09K 8/035* (2006.01)
*C09K 8/68* (2006.01)
*C09K 8/62* (2006.01)
*E21B 7/00* (2006.01)
*E21B 43/16* (2006.01)

(52) U.S. Cl.
CPC .................. *C09K 8/68* (2013.01); *E21B 7/00* (2013.01); *E21B 43/16* (2013.01); *C09K 2208/12* (2013.01)

(58) Field of Classification Search
USPC ........................................................ 166/308.3
See application file for complete search history.

(56) References Cited

U.S. PATENT DOCUMENTS 5,558,171 A * 9/1996 McGlothlin ........... C09K 8/145
  175/64

8,728,989 B2 * 5/2014 Kakadjian, Sr. ....... C09K 8/035
  507/221
2004/0097380 A1 5/2004 Summerhill
2009/0131280 A1 5/2009 Federici

OTHER PUBLICATIONS

International Search Report and Written Opinion, dated Sep. 25, 2014, for PCT/US2014/035074.
"Akzo Nobel Functional Chemicals AB Ethylene Amines", Sweden Berolamin-, Apr. 1, 2009 (Apr. 1, 2009), p. 20, XP055123149, Retrieved from the internet: URL:https://www.akzonobel.com/ea/system/images/AkzoNobel BA-20 PIS tcm53-24544.pdf [retrieved on Jun. 131, 2014] the whole document cas: 68910-05-4.
Amix 1000: "Safety Data Sheet", May 23, 2012 (May 23, 2012), XP055123150, Retrieved from the Internet:URL:http://worldaccount.basf.com/wa/NAFTA/Catalog/ChemicalsNAFTA/doc4/BASF/PRD/30036918/pdf?urn=urn:documentum:ProductBase_EU:09007af88008fb32.pdf [retrieved on Jun. 13, 2014] the whole document cas: 68910-05-4.

* cited by examiner

CLAY INHIBITORS FOR DRILLING, FRACTURING, AND OTHER PROCEDURES

RELATED CASES

This application claims the benefit of U.S. Provisional Patent Application Ser. No. 61/823,289 filed on May 14, 2013, and International Patent Application Serial Number PCT/US2014/035074, filed on Apr. 23, 2014; which are both hereby incorporated by reference in their entirety for all purposes.

FIELD OF THE INVENTION

The present invention relates to compositions for inhibiting clay swelling and to the use of such inhibitor compositions in drilling, fracturing, and other procedures.

BACKGROUND OF THE INVENTION

A need exists for improved chemical formulations that are effective for inhibiting clay swelling, particularly when conducting drilling, fracturing, or other operations in shale formations. Shale formations are rich in clay content. They are horizontally drilled and then hydraulically fractured in multiple stages. Clay is by nature hydrophilic and in the presence of water it tends to absorb water and swell. In some cases it may even disintegrate. During the drilling process, this may cause the hole to cave or cause the drilling cuttings to disintegrate into fines, which cannot be removed easily on the surface from the drilling fluid. During hydraulic fracturing, clay swelling may negatively affect production due to formation embedment in the proppant pack.

Water-based drilling fluids (muds) typically comprise a mixture of water and clay (e.g., bentonite) and also commonly include clay inhibitors and/or other chemicals. The drilling fluid is circulated through the well bore during drilling in order to lubricate and cool the drill bit, flush the cuttings out of the well, and strengthen the sides of the hole to prevent cave-ins. Typically, the drilling fluid is delivered downwardly into the well through the drill string and then returns upwardly through the annulus formed between the drill string and wall of the borehole.

Hydraulic fracturing fluids typically comprise water and sand, or other proppant materials, and also commonly include various types of chemical additives. Examples of such additives include: gelling agents which assist in suspending the proppant material; crosslinkers which help to maintain fluid viscosity at increased temperatures; gel breakers which operate to break the gel suspension after the fracture is formed and the proppant is in place; friction reducers; clay inhibitors; corrosion inhibitors; scale inhibitors; acids; surfactants; antimicrobial agents; and others. The hydraulic fracturing fluid is pumped into the subterranean formation under sufficient pressure to create, expand, and/or extend fractures in the formation and to thus provide enhanced recovery of the formation fluid.

SUMMARY OF THE INVENTION

The present invention provides inhibitor compositions which are well suited for use in drilling and fracturing fluids and procedures of the type described above. The compositions are surprisingly and unexpectedly effective for inhibiting clay swelling and have desirably low toxicity levels. The inventive inhibitors and the inventive drilling and fracturing compositions produced therefrom are therefore particularly effective for use in drilling and fracturing shale formations.

The inhibitor compositions are also well suited for use in other fluids and operations for treating wells or subterranean formations. Examples include, but are not limited to, fluids and operations for completions, flooding, conformist control, stimulation, enhanced recovery, anti-accretion, etc.

In one aspect of the present invention, there is provided a method of drilling a well wherein a water-based drilling fluid is circulated through a well bore as the well bore is being drilled. In accordance with the improvement provided by the present invention, the water-based drilling fluid includes an inhibitor composition comprising: (a) aminoethylethanolamine (AEEA) in an amount of from about 10% to about 50% by weight of the total weight of the inhibitor composition; (b) diethylenetriamine (DETA) in an amount of from 0% to about 70% by weight of the total weight of the inhibitor composition; (c) triethylenetetramine (TETA) in an amount of from 0% to about 70% by weight of the total weight of the inhibitor composition; (d) diethanolamine (DEA) in an amount of from 0% to about 50% by weight of the total weight of the inhibitor composition; and (e) triethanolamine (TEA) in an amount of from 0% to about 50% by weight of the total weight of the inhibitor composition. In the inhibitor composition, either DETA, TETA, or a combination of DETA and TETA is present in an amount of at least 5% by weight of the total weight of the inhibitor composition. In addition, either DEA, TEA, or a combination of the DEA and TEA is present in the inhibitor composition in an amount of at least 2% by weight of the total weight of the inhibitor composition.

In another aspect, there is again provided a method of drilling a well wherein a water-based drilling fluid is circulated through a well bore as the well as being drilled; however, in accordance with the improvement provided by the present invention, the water-based drilling fluid includes an inhibitor composition comprising: (a) AEEA in an amount of from about 25% to about 50% by weight of the total weight of the inhibitor composition and (b) DETA in an amount of from about 50% to about 75% by weight of the total weight of the inhibitor composition.

In another aspect, there is again provided a method of drilling a well wherein a water-based drilling fluid is circulated through a well bore as the well is being drilled; however, in accordance with the improvement provided by the present invention, the water-based drilling fluid includes an amount of an inhibitor composition effective to at least reduce clay swelling occurring in the well as the drilling fluid is circulated through the well bore, wherein the inhibitor composition is a distillation residuum bottoms composition remaining from a process wherein monoethanolamine has been reacted with ammonia to produce a reaction product composition and the reaction product composition has been fractionated to recover a piperazine distillate product therefrom, thus leaving the distillation residuum bottoms composition.

In another aspect, there is provided a method of fracturing a subterranean formation comprising injecting a fracturing fluid into the subterranean formation. In accordance with the improvement provided by the present invention, the fracturing fluid includes an inhibitor composition comprising: (a) aminoethylethanolamine (AEEA) in an amount of from about 10% to about 50% by weight of the total weight of the inhibitor composition; (b) diethylenetriamine (DETA) in an amount of from 0% to about 70% by weight of the total weight of the inhibitor composition; (c) triethylenetetramine (TETA) in an amount of from 0% to about 70% by weight of the total weight of the inhibitor composition; (d) diethanolamine (DEA) in an amount of from 0% to about 50% by weight of the total weight of the inhibitor composition; and (e) triethanolamine (TEA) in an amount of from 0% to about 50% by weight of the total weight of the inhibitor composition. In the inhibitor composition, either DETA, TETA, or a combination of DETA and TETA is present in an amount of at least 5% by weight of the total weight of the inhibitor composition. In addition, either DEA, TEA, or a combination of the DEA and TEA is present in the inhibitor composition in an amount of at least 2% by weight of the total weight of the inhibitor composition.

In another aspect, there is again provided a method of fracturing a subterranean formation comprising injecting a fracturing fluid into the subterranean formation; however, in accordance with the improvement provided by the present invention, the fracturing fluid includes an inhibitor composition comprising: (a) AEEA in an amount of from about 25% to about 50% by weight of the total weight of the inhibitor composition and (b) DETA in an amount of from about 50% to about 75% by weight of the total weight of the inhibitor composition.

In another aspect, there is again provided a method of fracturing a subterranean formation comprising injecting a fracturing fluid into the subterranean formation; however, in accordance with the improvement provided by the present invention, the fracturing fluid includes an amount of an inhibitor composition effective to at least reduce clay swelling occurring in the subterranean formation when the fracturing fluid is injected, wherein the inhibitor composition is a distillation residuum bottoms composition remaining from a process wherein monoethanolamine has been reacted with ammonia to produce a reaction product composition and the reaction product composition has been fractionated to recover a piperazine distillate product therefrom, thus leaving the distillation residuum bottoms composition.

In another aspect, there is provided a method of treating a well or a subterranean formation comprising injecting a treatment fluid into the well or the subterranean formation. In accordance with the improvement provided by the present invention, the treatment fluid includes an inhibitor composition comprising: (a) aminoethylethanolamine (AEEA) in an amount of from about 10% to about 50% by weight of the total weight of the inhibitor composition; (b) diethylenetriamine (DETA) in an amount of from 0% to about 70% by weight of the total weight of the inhibitor composition; (c) triethylenetetramine (TETA) in an amount of from 0% to about 70% by weight of the total weight of the inhibitor composition; (d) diethanolamine (DEA) in an amount of from 0% to about 50% by weight of the total weight of the inhibitor composition; and (e) triethanolamine (TEA) in an amount of from 0% to about 50% by weight of the total weight of the inhibitor composition. In the inhibitor composition, either DETA, TETA, or a combination of DETA and TETA is present in an amount of at least 5% by weight of the total weight of the inhibitor composition. In addition, either DEA, TEA, or a combination of the DEA and TEA is present in the inhibitor composition in an amount of at least 2% by weight of the total weight of the inhibitor composition.

In another aspect, there is again provided a method of treating a well or a subterranean formation comprising injecting a treatment fluid into the well or the subterranean formation; however, in accordance with the improvement provided by the present invention, the treatment fluid includes an inhibitor composition comprising: (a) AEEA in an amount of from about 25% to about 50% by weight of the total weight of the inhibitor composition and (b) DETA in an amount of from about 50% to about 75% by weight of the total weight of the inhibitor composition.

In another aspect, there is again provided a method of treating a well or a subterranean formation comprising injecting a treatment fluid into the well or the subterranean formation; however, in accordance with the improvement provided by the present invention, the treatment fluid includes an amount of an inhibitor composition effective to at least reduce clay swelling occurring during injection, wherein the inhibitor composition is a distillation residuum bottoms composition remaining from a process wherein monoethanolamine has been reacted with ammonia to produce a reaction product composition and the reaction product composition has been fractionated to recover a piperazine distillate product therefrom, thus leaving the distillation residuum bottoms composition.

Further aspects, features, and advantages of the present invention will be apparent to those of ordinary skill in the art upon examining the accompanying drawings and upon reading the following Detailed Description of the Preferred Embodiments.

DETAILED DESCRIPTION OF THE PREFERRED EMBODIMENTS

The present invention provides improved compositions and methods for drilling wells, fracturing subterranean formations, and other treatments. The inventive drilling and fracturing compositions and methods are particularly effective for use in shale formations but can also be used in generally any other type of formation.

In the inventive drilling method, a water-based drilling fluid including an inhibitor composition provided by the present invention is circulated through the well bore as the well is being drilled. In the inventive fracturing method, a fracturing fluid including the inhibitor composition provided by the present invention is injected into a subterranean formation, preferably under sufficient pressure to create, expand, and/or extend fractures in the formation and to thereby provide enhanced recovery of the formation fluid.

Similarly, in other treatment methods provided by the present invention for treating wells or subterranean formations, a treatment fluid including a sufficient amount of the inhibitor composition provided by the present invention to at least reduce clay swelling is injected into the well or formation. Examples of such treatment operations include, but are not limited to, completions, flooding, conformist control, stimulation, enhanced recovery, and anti-accretion.

In each embodiment described below, the inhibitor composition provided and used in accordance with the present invention preferably comprises aminoethylethanolamine (AEEA) in an amount of from about 10% to about 50% by weight of the total weight of the inhibitor composition. More preferably, AEEA comprises at least 25% by weight of the inhibitor composition and is most preferably present in the inhibitor composition in an amount of from about 25% by weight to about 40% by weight of the total weight of the inhibitor composition.

The inhibitor composition also preferably comprises one or more of the following components (as expressed in percentages by weight based upon the total weight of the inhibitor composition):

Diethylenetriamine (DETA): 0% to about 75%;
Triethylenetetramine (TETA): 0% to about 70%;
Diethanolamine (DEA): 0% to about 50%;
Triethanolamine (TEA): 0% to about 50%; and/or
Hydroxyethylpiperazine (HEP): 0% to about 25%.

In a first subset of the general compositions described above, the inhibitor composition preferably comprises (a) AEEA in an amount of from about 25% to about 50% by weight of the total weight of the inhibitor composition and (b) DETA in an amount of from about 50% to about 75% by weight of the total weight of the inhibitor composition. More preferably, in this embodiment, the inhibitor composition consists essentially of only AEEA and DETA and most preferably consists essentially of about 30% by weight AEEA and 70% by weight DETA.

In a second subset of the general compositions described above, in addition to the requirement that the inhibitor must include at least from about 10% to about 50% by weight (more preferably at least 25% and most preferably from about 25% to about 40% by weight) AEEA, the inhibitor composition must also include both: (a) DETA or TETA, or a combination of DETA and TETA, in an amount of at least 5% by weight of the total weight of the inhibitor composition and (b) DEA or TEA, or a combination of DEA and TEA, in an amount of at least 10% by weight of the total weight of the inhibitor composition. In addition, it is also preferred in these compositions that the amounts of DETA, TETA, DEA, and HEP present in the inhibitor be within the following ranges (as expressed in percentages by weight based upon the total weight of the inhibitor composition):

Diethylenetriamine (DETA): 0% to about 20%;
Triethylenetetramine (TETA): 0% to about 20%;
Diethanolamine (DEA): 0% to about 25%;
Triethanolamine (TEA): 0% to about 15%; and/or
Hydroxyethylpiperazine (HEP): 0% to about 20%.

By way of example, but not by way of limitation, one preferred inhibitor composition within the second subset of compositions as defined above includes about 2% or more by weight DEA based on the total weight of the inhibitor composition. An example of another preferred inhibitor composition within the second subset of compositions as defined above includes about 3% or more by weight TEA based upon the total weight of the inhibitor composition. An example of another preferred inhibitor composition within the second subset of compositions as defined above includes from about 1% to about 15% by weight HEP based upon the total weight of the inhibitor composition.

Another preferred example of an inhibitor composition falling within in the second subset of compositions defined above is the chemical composition having Chemical Abstracts Service (CAS) Registry No. 68910-05-4. This composition is the distillation residuum bottoms composition remaining from the process wherein monoethanolamine (i.e., 2-aminoethanol) is reacted with ammonia to produce a reaction product which is then fractionated to recover a piperazine distillate product therefrom, thus leaving the remaining CAS Reg. No. 68910-05-4 distillation residuum bottoms composition.

As will be shown below, this distillation residuum bottoms composition is surprisingly and unexpectedly effective for use as a clay inhibitor composition for drilling, fracturing, or other operations. Heretofore, to our knowledge, although it has been suggested that the distillation residuum bottoms composition could be used as an intermediate in the production of a binding agent, the residuum bottoms composition has largely been treated as a waste product.

Based upon the total weight of the distillation residuum bottoms composition, the residuum bottoms composition will typically comprise from about 25% to about 50% by weight AEEA and will also typically comprise: at least 1% by weight DETA; at least 4% by weight TETA; at least 4.5% by weight DEA; and at least 5% by weight TEA. The distillation residuum bottoms composition will also typically comprise at least 1.5% by weight HEP based upon the total weight of the residuum bottoms composition.

More typically, based upon the total weight of the distillation residuum bottoms composition, the residuum bottoms composition will commonly comprise: from about 30% to about 40% by weight (most commonly from about 35% to about 38.5% by weight) AEEA; from about 2.0% to about 4.5% by weight DETA; from about 5.5% to about 12.5% by weight TETA; from about 6.0% to about 13% by weight DEA; from about 7.0% to about 7.5% by weight TEA; from about 1.5% to about 10% by weight HEP; and from about 15% to about 42% by weight of other amines. Examples of other amines which may be present in the residuum bottom composition include, but are not limited to, unreacted monoethanolamine, unrecovered piperazine, 2-piperazinoethanol, tetraethylenepentamine, and higher ethyleneamines.

The distillation residuum bottoms composition CAS Reg. No. 68910-05-4 is commercially available, for example, from Dow Chemical Co. under the name AMINE HST and is also available from BASF under the name AMIX 1000. AMINE HST has: an estimated boiling point (760 mmHg) of 256° C.; and estimated flashpoint (closed cup) of 146° C.; an estimated vapor pressure of less than 0.01 mmHg at 20° C.; an estimated vapor density (air=1) of 4.6; an estimated specific gravity (water=1) of 1.0-1.3 at 20° C./20° C.; an estimated solubility in water of 100% by weight at 20° C.; and an estimated pour point of −24° C.

Similarly, AMIX 1000 has: a melting point of −30° C.; a boiling temperature range of 236-310° C.; a density at 20° C. of 1.04 g/cm$^3$; a flashpoint of 132° C.; an ignition temperature of 360° C.; a vapor pressure (20° C.) of about 0.1 hPa; and a pH of approximately 11.

In the inventive drilling method, the inhibitor composition provided by the present invention will preferably be used in the water-based drilling fluid in an amount effective to at least reduce clay swelling occurring in the well as the drilling fluid is circulated through the well bore. The inhibitor composition will more preferably be used in an amount in the range of from about 0.5% to about 5% by weight and will most preferably be used in amount of from about 2% to about 4% by weight, based upon the total weight of the water-based drilling fluid.

In the inventive fracturing method, the inhibitor composition provided by the present invention will preferably be used in the hydraulic fracturing fluid in an amount effective to at least reduce clay swelling occurring in the subterranean formation when the fracturing fluid is injected. The inhibitor composition will more preferably be used in an amount in the range of from about 0.05% to about 2% by weight and will most preferably be used in amount in the range of from about 0.2% to about 0.7% by weight, based upon the total weight of the hydraulic fracturing fluid.

The following examples are meant to illustrate, but in no way limit, the claimed invention.

Example 1

The suitability of Dow AMINE HST for use as a clay inhibitor in water-based drilling and fracturing fluids was evaluated by using a Capillary Suction Timer (CST) and by performing a rheological study to obtain a viscosity vs. shear profile. For testing, the AMINE HST material was mixed with tap water for 10 minutes in a Hamilton Beach mixer to make a 3% wt. solution of inhibitor in water. Next, 50 g of IPA Bentonite clay was added over one minute to the 3% inhibitor solution and the mixture was stirred for 90 minutes at room temperature.

For comparison purposes, identical 3% mixtures of four well-known high performance inhibitors currently used in the art were prepared using the same procedure. The prior art inhibitors were tetramethylammonium chloride (TMAC), choline chloride, Jeffamine D-230, and potassium chloride (KCl).

In testing samples of each of these mixtures, an OFI CST 294-50 instrument using Whatman 17 Standard CST paper was first prepared by cleaning the electrodes of the instrument and replacing the CST paper. A transfer pipet was then used to pull a 2 mL sample of the mixture and inject the sample into the center of the CST device. The capillary action movement of the liquid mixture was then measured in terms of the time required for the sample front to move from the first electrode to the second electrode. The time was recorded and the test was then repeated four additional times for each test mixture.

In the rheological studies for each of the suspensions identified above, after 90 minutes of stirring, a 25 mL sample of the suspension was poured into a 50 mL beaker. If the sample foamed and did not disperse, the sample was heated (90° F.) and stirred gently on a magnetic stir plate for 2-5 minutes and the non-dispersed foam was removed with a spatula. All experiments were performed at 23.5° C. The sample was poured into the sample cup of an Anton Paar MCR-302 rheometer concentric cylinder, and viscosity vs. shear rate data was recorded after a five minute temperature equilibration time. The sample was sheared from $1{,}000\ \mathrm{sec}^{-1}$ to $0.1\ \mathrm{sec}^{-1}$ over 120 minutes and the data was recorded using Rheoplus software.

TABLE I

|  | TMAC | Choline Chloride | Jeffamine D-230 | KCl | AMINE HST |
|---|---|---|---|---|---|
|  | 51.2 | 43.6 | 47.5 | 64.1 | 25.3 |
|  | 61.3 | 45.6 | 49.7 | 60.5 | 25.4 |
|  | 56.8 | 43.3 | 48.3 | 60.3 | 24.9 |
|  | 55.8 | 43.3 | 46.7 | 57.4 | 25.4 |
|  | 59.7 | 44.8 | 45.2 | 64 | 24.7 |
| average = | 56.96 | 44.12 | 47.48 | 61.26 | 25.14 |

All inhibitors tested at 3% wt. concentration

Figure 1:
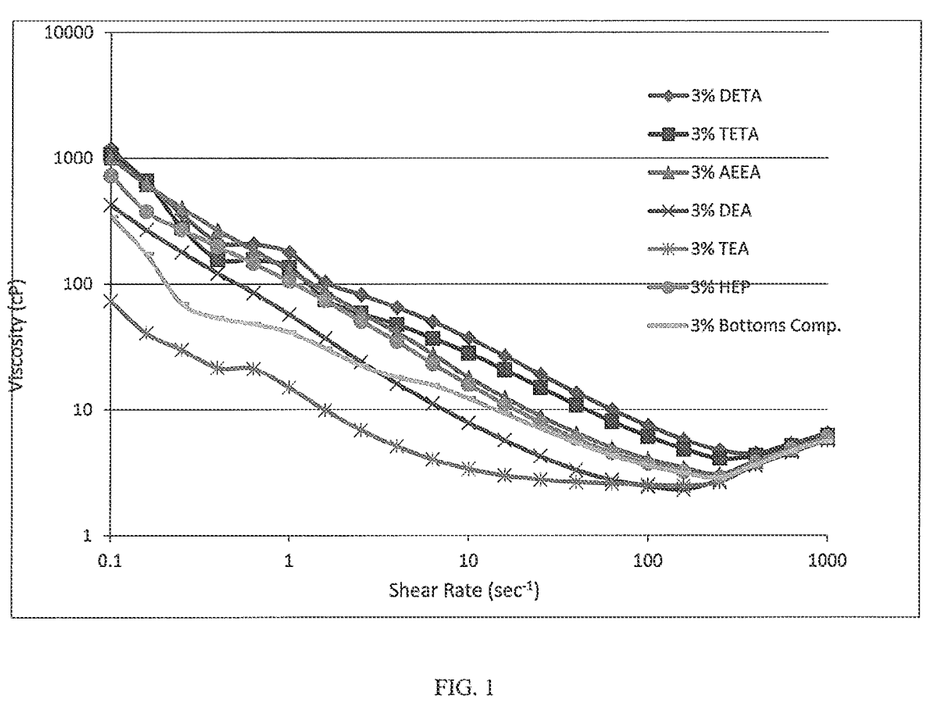
FIG. 1 is a graph showing viscosity vs. shear test results for an inhibitor composition of the present invention as compared to four prior art inhibitor compositions.

The results provided in Table I and in FIG. 1 show that AMINE HST unexpectedly outperformed the prior art inhibitors in the CST and rheology tests. The viscosity vs. shear results for AMINE HST were desirably lower than the results provided by each of the prior art inhibitors. Moreover, the CST times provided by AMINE HST were close to two times faster than the CST results provided by choline chloride and Jeffamine D-230 and were more than twice as fast as the CST results provided by TAMC (tetramethylammonium chloride) and KCl.

Example 2

Additional CST tests were also performed using the same sample preparation procedures as used in Example 1 for the following compositions:
100 wt % DETA
100 wt % TETA
100 wt % AEEA
100 wt % DEA
100 wt % TEA
100 wt % HEP
70 wt % DETA and 30 wt % AEEA
70 wt % TETA and 30 wt % AEEA
Syn. Comp. 1: 32 wt % AEEA, 12 wt % TEA, 8 wt % DEA, 10 wt % HEP, and 38 wt % DETA
Syn. Comp. 2: 32 wt % AEEA, 12 wt % TEA, 8 wt % DEA, 10 wt % HEP, and 38 wt % TETA
Syn. Comp. 3: 32 wt % AEEA, 12 wt % TEA, 8 wt % DEA, 10 wt % HEP, 19 wt % TETA, and 19 wt % DETA The results of the CST tests for these compositions are provided below in Table II. Table II also repeats the results reported for AMINE HST in Example 1.

TABLE II

|  | DETA | TETA | AEEA | DEA | TEA | HEP | DETA + AEEA** | TETA + AEEA# | Syn. Comp. 1* | Syn. Comp. 2+ | Syn. Comp. 3− | AMINE HST |
|---|---|---|---|---|---|---|---|---|---|---|---|---|
|  | 23.8 | 26.4 | 175.3 | 254 | 129.1 | 127.2 | 22.6 | 31 | 29.1 | 28.8 | 30.9 | 25.3 |
|  | 25.9 | 25.8 | 178.1 | 229.5 | 124.6 | 116.4 | 23.7 | 30.7 | 28.2 | 30.1 | 32.4 | 25.4 |
|  | 24.3 | 24.5 | 176.3 | 243.4 | 126.6 | 112.1 | 19.7 | 30.1 | 29.4 | 31.8 | 31.2 | 24.9 |
|  | 26.1 | 25.4 | 169.2 | 247.2 | 127.7 | 122.6 | 19.9 | 31.1 | 27.8 | 30.1 | 31.3 | 25.4 |
|  | 25.6 | 24.4 | 170.9 | 252.8 | 125.9 | 120.2 | 20.2 | 30.1 | 28.5 | 29.8 | 30.6 | 24.7 |
| average = | 25.14 | 25.3 | 173.96 | 245.38 | 126.78 | 119.7 | 21.22 | 30.6 | 28.6 | 30.12 | 31.28 | 25.14 |

DETA + AEEA** DETA = 70%, AEEA = 30%
TETA + AEEA# TETA = 70%, AEEA = 30%
*Synthetic Composition 1 AEEA = 32%, TEA + 12%, DEA = 8%, HEP = 10%, DETA = 38%
+Synthetic Composition 2 AEEA = 32%, TEA + 12%, DEA = 8%, HEP = 10%, DETA = 38%
−Synthetic Composition 3 AEEA = 32%, TEA + 12%, DEA = 8%, HEP = 10%, DETA = 19%, TETA = 19%

The time results of the CST tests are provided below in Table I. All results recorded in Table I are in seconds. The viscosity vs. shear results for AMINE HST and for the four comparative prior art inhibitors are provided in FIG. 1.

The CST results reported in Table II are unexpected and surprising in several respects. For example, the CST times for AMINE HST and for the Synthetic bottoms-type compositions 1, 2 and 3 were as good as, or substantially as good as, the results provided by DETA or TETA alone, in spite of the fact that AMINE HST and each of the synthetic bottoms compositions contained high amounts of AEEA, DEA, TEA, and HEP, each of which, when tested alone, exhibited CST times which were almost 5 to 10 times slower than the CST times exhibited by either DETA or TETA. In addition, the composition consisting only of a combination of DETA and AEEA exhibited synergistic CST results which were not only superior to the other compositions, but were better than the results provided by either DETA or AEEA alone.

Figure 2:
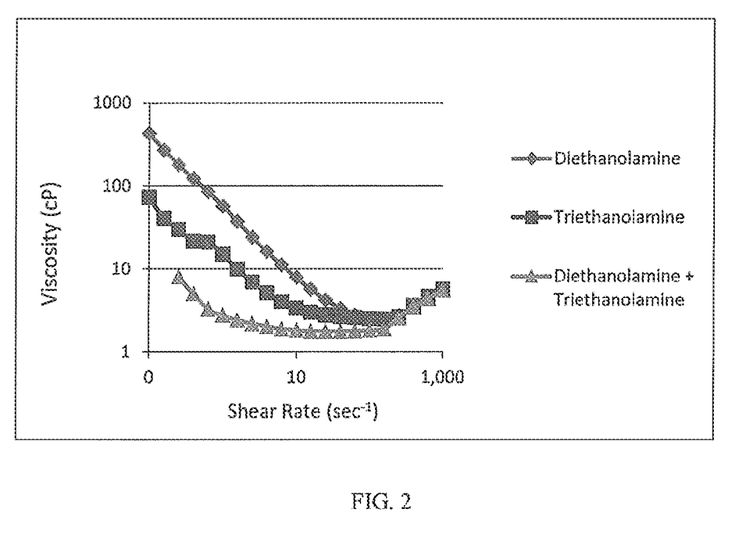
FIG. 2 is a graph showing viscosity vs. shear test results for an inhibitor composition consisting of a combination of DEA and TEA as compared to DEA and TEA individually.

Further, unexpected synergistic rheology results for the composition consisting of DEA and TEA are illustrated in FIG. 2. As seen in FIG. 2, the viscosity vs. shear results for the combination of DEA and TEA were desirably lower than the results provided by either DEA or TEA alone.

Example 3

The performance of Dow AMINE HST as a clay stabilizer, as compared to the other inhibitors identified in Table III, was also investigated by retention testing. Samples of midway shale were passed through a Combustion Engineering U.S.A Standard Testing 16-mesh sieve and the small particulates that passed through the sieve were discarded, while the larger pieces were set aside for later use. 3 wt % inhibitor solutions were prepared in 1 L bottles by addition of inhibitor to a pre-weighed bottle, and then water was added until the final solution mass reached 875 g. The bottle was then shaken to homogenize the mixture Into a 250 mL pressure cell was placed 21.0 g of relatively uniform shale pieces and 234.0 g of inhibitor solution from the 1 L bottle, after which the cell was pressurized with 100 psi of nitrogen. Each inhibitor was tested in triplicate. The cells were placed into a roller oven that had been preheated to 250° F. and then rolled for 16 hours. The cells were cooled in a water bath, and the contents of the cells were collected onto the 16-mesh sieve and dried. The mass of the inhibitor-exposed shale after hot-rolling was normalized by the initial mass of shale and multiplied by 100 to give the percent of shale retained. The results are summarized below in Table III.

TABLE III

| | Inhibitor | | | | | | |
|---|---|---|---|---|---|---|---|
| | 3 wt % DETA | 3 wt % AMINE HST | 3 wt % Jeffamine D-230 | 3 wt % TMAC | 3 wt % TETA | 3 wt % Choline Chloride | 6 wt % KCl |
| Retention (%) | 99.1 | 98.8 | 85.5 | 69.9 | 78.6 | 68.9 | 63.4 |

The retention results provided by AMINE HST, which were substantially the same as for DETA, were better than the results provided by the prior art inhibitors Jeffamine D-230 and TMAC and were significantly superior to TETA and to the prior art inhibitors choline chloride and potassium chloride.

Figure 3:
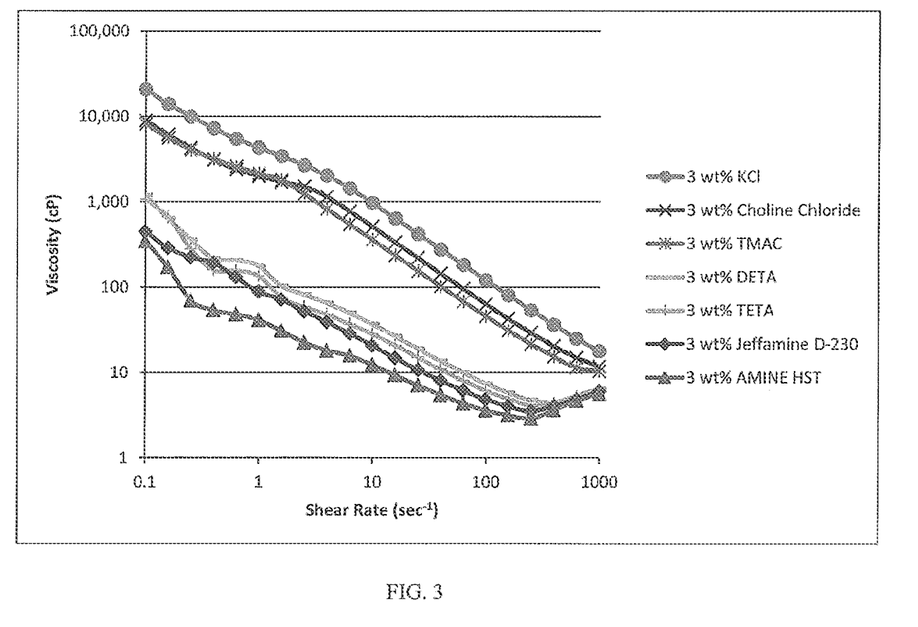
FIG. 3 is a graph showing viscosity vs. shear test results for AMINE HST as compared to the other inhibitors identified herein in Example 3.

Rheological measurements of clays treated with the stabilizers in Table III are shown in FIG. 3. AMINE HST performs comparably to the synthetic bottoms composition in FIG. 1, and provides much lower viscosities than the other inhibitors from Table III.

Thus, the present invention is well adapted to carry out the objects and attain the ends and advantages mentioned above as well as those inherent therein. While presently preferred embodiments have been described for purposes of this disclosure, numerous changes and modifications will be apparent to those of ordinary skill in the art. Such changes and modifications are encompassed within this invention as defined by the claims.

What is claimed is:

1. A method of drilling a well, the method comprising drilling a well bore and circulating a water-based drilling fluid through said well bore when drilling said well bore, wherein the water-based drilling fluid includes a clay swelling inhibitor composition comprising:
   aminoethylethanolamine (AEEA) in an amount of from about 10% to about 50% by weight of a total weight of said clay swelling inhibitor composition;
   diethylenetriamine (DETA) in an amount of from 0% to about 70% by weight of said total weight of said clay swelling inhibitor composition;
   triethylenetetramine (TETA) in an amount of from 0% to about 70% by weight of said total weight of said clay swelling inhibitor composition;
   diethanolamine (DEA) in an amount of from 0% to about 50% by weight of said total weight of said clay swelling inhibitor composition; and
   triethanolamine (TEA) in an amount of from 0% to about 50% by weight of said total weight of said clay swelling inhibitor composition,
   wherein said DETA or said TETA, or a combination of said DETA and said TETA, is present in said clay swelling inhibitor composition in an amount of at least 5% by weight of said total weight of said clay swelling inhibitor composition and
   said DEA or said TEA, or a combination of said DEA and said TEA, is present in said clay swelling inhibitor composition in an amount of at least 2% by weight of said total weight of said clay swelling inhibitor composition.

2. The method of claim 1, wherein the amount of said AEEA is at least 25% by weight of said total weight of said clay swelling inhibitor composition.

3. The method of claim 2, wherein the amount of said DEA is about 2% or more by weight of said total weight of said clay swelling inhibitor composition.

4. The method of claim 2, wherein the amount of said TEA is about 3% or more by weight of said total weight of said clay swelling inhibitor composition.

5. The method of claim 1, wherein the clay swelling inhibitor composition further comprises an amount of hydroxyethylpiperazine (HEP) of from about 1% to about 15% by weight of said total weight of said clay swelling inhibitor composition.

6. The method of claim 1, wherein:
   said AEEA is present in an amount of from about 25% to about 50% by weight of said total weight of said clay swelling inhibitor composition and
   said DETA is present in an amount of from about 50% to about 75% by weight of said total weight of said clay swelling inhibitor composition.

7. The method of claim 6, wherein the clay swelling inhibitor composition consists essentially of only said AEEA and said DETA.

8. A method of drilling a well that at least reduces clay swelling that occurs in the well as a water-based drilling fluid is circulated through the well, the method comprising drilling a well bore and circulating the water-based drilling fluid through the well bore when drilling the well bore, wherein the water-based drilling fluid includes a clay swelling inhibitor composition that is a distillation residuum bottoms composition remaining from a process wherein monoethanolamine has been reacted with ammonia to produce a reaction product composition and said reaction product composition has been fractionated to recover a piperazine distillate product therefrom and to leave said distillation residuum bottoms composition.

9. The method of claim 8, wherein the distillation residuum bottoms composition comprising from about 25% to about 50% by weight aminoethylethanolamine (AEEA) based on a total weight of said distillation residuum bottoms composition.

10. The method of claim 9, wherein the distillation residuum bottoms composition comprising, based upon said total weight of said distillation residuum bottoms composition,
at least 1% by weight diethylenetriamine (DETA),
at least 4% by weight triethylenetetramine (TETA),
at least 4.5% by weight diethanolamine (DEA), and
at least 5% by weight triethanolamine (TEA).

11. The method of claim 10, wherein the distillation residuum bottoms composition further comprises at least 1.5% by weight hydroxyethylpiperazine based upon said total weight of said distillation residuum bottoms composition.

12. The method of claim 10, wherein the distillation residuum bottoms composition is present in said water-based drilling fluid in an amount of from about 0.5% to about 5% by weight based upon a total weight of said water-based drilling fluid.

13. A method of fracturing a subterranean formation, the method comprising injecting a water-based fracturing fluid into said subterranean formation, wherein the water-based fracturing fluid includes a clay swelling inhibitor composition comprising:
aminoethylethanolamine (AEEA) in an amount of from about 10% to about 50% by weight of a total weight of said clay swelling inhibitor composition;
diethylenetriamine (DETA) in an amount of from 0% to about 70% by weight of said total weight of said clay swelling inhibitor composition;
triethylenetetramine (TETA) in an amount of from 0% to about 70% by weight of said total weight of said clay swelling inhibitor composition;
diethanolamine (DEA) in an amount of from 0% to about 50% by weight of said total weight of said clay swelling inhibitor composition; and
triethanolamine (TEA) in an amount of from 0% to about 50% by weight of said total weight of said clay swelling inhibitor composition,
wherein said DETA or said TETA, or a combination of said DETA and said TETA, is present in said clay swelling inhibitor composition in an amount of at least 5% by weight of said total weight of said clay swelling inhibitor composition and
said DEA or said TEA, or a combination of said DEA and said TEA, is present in said clay swelling inhibitor composition in an amount of at least 2% by weight of said total weight of said clay swelling inhibitor composition.

14. The method of claim 13, wherein the amount of said AEEA is at least 25% by weight of said total weight of said clay swelling inhibitor composition.

15. The method of claim 14, wherein the amount of said DEA is about 2% or more by weight of said total weight of said clay swelling inhibitor composition.

16. The method of claim 14, wherein the amount of said TEA is about 3% or more by weight of said total weight of said clay swelling inhibitor composition.

17. The method of claim 13, wherein the clay swelling inhibitor composition further comprises an amount of hydroxyethylpiperazine (HEP) of from about 1% to about 15% by weight of said total weight of said clay swelling inhibitor composition.

18. The method of claim 13, wherein:
said AEEA is present in an amount of from about 25% to about 50% by weight of said total weight of said clay swelling inhibitor composition and
said DETA is present in an amount of from about 50% to about 75% by weight of said total weight of said clay swelling inhibitor composition.

19. The method of claim 18, wherein the clay swelling inhibitor composition consists essentially of only said AEEA and said DETA.

20. A method of fracturing a subterranean formation that at least reduces clay swelling that occurs in the subterranean formation as a water-based fracturing fluid is injected into the subterranean formation, the method comprising injecting the water-based fracturing fluid into said subterranean formation, wherein the water-based fracturing fluid includes a clay swelling inhibitor composition that is a distillation residuum bottoms composition remaining from a process wherein monoethanolamine has been reacted with ammonia to produce a reaction product composition and said reaction product composition has been fractionated to recover a piperazine distillate product therefrom and to leave said distillation residuum bottoms composition.

21. The method of claim 20, wherein the distillation residuum bottoms composition comprises from about 25% to about 50% by weight aminoethylethanolamine (AEEA) based on a total weight of said distillation residuum bottoms composition.

22. The method of claim 21, wherein the distillation residuum bottoms composition comprises, based upon said total weight of said distillation residuum bottoms composition,
at least 1% by weight diethylenetriamine (DETA),
at least 4% by weight triethylenetetramine (TETA),
at least 4.5% by weight diethanolamine (DEA), and
at least 5% by weight triethanolamine (TEA).

23. The method of claim 22, wherein the distillation residuum bottoms composition further comprises at least 1.5% by weight hydroxyethylpiperazine based upon said total weight of said distillation residuum bottoms composition.

24. The method of claim 22, wherein the distillation residuum bottoms composition is present in water-based fracturing fluid in an amount of from about 0.05% to about 2% by weight based upon a total weight of said water-based fracturing fluid.

25. A method of treating a well or a subterranean formation, the method comprising injecting a water-based treatment fluid into said well or said subterranean formation, wherein the water-based treatment fluid includes a clay swelling inhibitor composition comprising:
aminoethylethanolamine (AEEA) in an amount of from about 10% to about 50% by weight of a total weight of said clay swelling inhibitor composition;
diethylenetriamine (DETA) in an amount of from 0% to about 70% by weight of said total weight of said clay swelling inhibitor composition;
triethylenetetramine (TETA) in an amount of from 0% to about 70% by weight of said total weight of said clay swelling inhibitor composition;
diethanolamine (DEA) in an amount of from 0% to about 50% by weight of said total weight of said clay swelling inhibitor composition; and
triethanolamine (TEA) in an amount of from 0% to about 50% by weight of said total weight of said clay swelling inhibitor composition,
wherein said DETA or said TETA, or a combination of said DETA and said TETA, is present in said clay swelling inhibitor composition in an amount of at least 5% by weight of said total weight of said clay swelling inhibitor composition and
said DEA or said TEA, or a combination of said DEA and said TEA, is present in said clay swelling inhibitor composition in an amount of at least 2% by weight of said total weight of said clay swelling inhibitor composition.

26. The method of claim 25, wherein the amount of said AEEA is at least 25% by weight of said total weight of said clay swelling inhibitor composition.

27. The method of claim 26, wherein the amount of said DEA is about 2% or more by weight of said total weight of said clay swelling inhibitor composition.

28. The method of claim 26, wherein the amount of said TEA is about 3% or more by weight of said total weight of said clay swelling inhibitor composition.

29. The method of claim 25, wherein the clay swelling inhibitor composition further comprises an amount of hydroxyethylpiperazine (HEP) of from about 1% to about 15% by weight of said total weight of said clay swelling inhibitor composition.

30. The method of claim 25, wherein said water-based treatment fluid is a completion fluid, a flood, a conformist control fluid, or other enhanced recovery fluid.

31. The method of claim 25, wherein:
said AEEA is present in an amount of from about 25% to about 50% by weight of said total weight of said clay swelling inhibitor composition and
said DETA is present in an amount of from about 50% to about 75% by weight of said total weight of said clay swelling inhibitor composition.

32. The method of claim 31, wherein the clay swelling inhibitor composition consists essentially of only said AEEA and said DETA.

33. The method of claim 31, wherein said water-based treatment fluid is a completion fluid, a flood, a conformist control fluid, or other enhanced recovery fluid.

34. A method of treating a well or subterranean formation that at least reduces clay swelling that occurs in the well or subterranean formation as a treatment fluid is injected in the well or the subterranean formation, the method comprising injecting a water-based treatment fluid into said well or said subterranean formation, wherein the water-based treatment fluid includes a clay swelling inhibitor composition that is a distillation residuum bottoms composition remaining from a process wherein monoethanolamine has been reacted with ammonia to produce a reaction product composition and said reaction product composition has been fractionated to recover a piperazine distillate product therefrom and to leave said distillation residuum bottoms composition.

35. The method of claim 34, wherein the distillation residuum bottoms composition comprises from about 25% to about 50% by weight aminoethylethanolamine (AEEA) based on a total weight of said distillation residuum bottoms composition.

36. The method of claim 35, wherein the distillation residuum bottoms composition comprises, based upon said total weight of said distillation residuum bottoms composition,
at least 1% by weight diethylenetriamine (DETA),
at least 4% by weight triethylenetetramine (TETA),
at least 4.5% by weight diethanolamine (DEA), and
at least 5% by weight triethanolamine (TEA).

37. The method of claim 36, wherein the distillation residuum bottoms composition further comprises at least 1.5% by weight hydroxyethylpiperazine based upon said total weight of said distillation residuum bottoms composition.

38. The method of claim 36, wherein the distillation residuum bottoms composition is present in said water-based treatment fluid in an amount of from about 0.05% to about 5% by weight based upon a total weight of said water-based treatment fluid.

39. The method of claim 34, wherein said water-based treatment fluid is a completion fluid, a flood, a conformist control fluid, or other enhanced recovery fluid.

* * * * *